United States Patent [19]

Stephens

[11] 4,057,126
[45] Nov. 8, 1977

[54] LUBRICANT WIPER
[75] Inventor: Robert K. Stephens, Brookfield, Wis.
[73] Assignee: The Falk Corporation, Milwaukee, Wis.
[21] Appl. No.: 670,208
[22] Filed: Mar. 25, 1976
[51] Int. Cl.² .............................................. F01M 1/00
[52] U.S. Cl. .................................................. 184/11 R
[58] Field of Search ........................ 184/11 R; 74/467

[56] References Cited
U.S. PATENT DOCUMENTS

| 1,972,911 | 9/1934 | Acker | 184/11 R |
| 2,020,263 | 11/1935 | Marthinsen | 184/11 R |

FOREIGN PATENT DOCUMENTS

| 658,014 | 10/1951 | United Kingdom | 184/11 R |

Primary Examiner—Samuel Feinberg
Attorney, Agent, or Firm—Quarles & Brady

[57] ABSTRACT

A lubricant wiper of the type used to wipe lubricant from a rotating member has a curved wiping surface and is pivotally mounted adjacent to the rotating member in such a manner that the curved wiping surface of the wiper is maintained by gravity in contact with the side of said rotating member to wipe lubricant therefrom. In the preferred embodiment, the wiper is pivotally mounted on a support and has a center of gravity to the opposite side of the pivot point from the curved wiping surface. The support also carries a trough to collect and transport the lubricant wiped from the rotating member.

4 Claims, 2 Drawing Figures

4,057,126

LUBRICANT WIPER

BACKGROUND OF THE INVENTION

There is a continuing need for improvements in lubricating systems for gear sets and the like, and one area of particular need is for improved lubrication of the bearings in such sets. The present invention relates to an improved lubricant wiper for a gear set in which the lubricant which is stored in a reservoir in the bottom of the gear set housing is lifted from the reservoir by a gear, wiped from the surface of the gear, and collected in open channels in the housing which lead to the bearings. Lubricating systems employing wipers are disclosed in the Henderson et al. U.S. Pat. No. 1,971,781 issued Aug. 28, 1934 and the Schmitter U.S. Pat. No. 2,676,671 issued Apr. 27. 1954. Although the improvements disclosed in both of the above patents do increase the effectiveness of the lubrication in gear sets, the oil wipers disclosed are not completely satisfactory. For example, the wipers disclosed are difficult to adjust; can be maladjusted; can fail to wipe under certain circumstances; and must be made in a wide variety of sizes for use with different sized gear sets.

SUMMARY OF THE INVENTION

A lubricant wiper is disclosed for wiping lubricant from the face of a rotating object; the wiper is adapted to be pivotally connected to a support so that the wiper can be positioned near the rotating object and the wiper has a curved wiping surface that has a center of gravity which is to the opposite side of the pivot point of the curved surface so that the curved wiping surface is maintained by gravity in a wiping relationship with the side of the rotating object.

It is an object of this invention to provide more effective lubrication for systems including rotating members such as gears. Another object is to provide a lubricant wiper which is positioned by gravity and which self-adjusts to axial displacements of the gear. Further objects are to provide a lubricant wiper of increased reliability which cannot be improperly adjusted; which functions in both directions of gear rotation and which can be used with gears of any width. A more limited object is to provide the particular structures hereinafter claimed.

The foregoing and other objects and advantages will appear from the following description. In that description, reference is made to the accompanying drawings which form a part thereof, and in which there is shown by way of illustration and not of limitation a preferred embodiment of the invention.

BRIEF DESCRIPTION OF THE DRAWINGS

FIG. 1 is a perspective view partially sectioned of a worm gear type speed reducer.

DESCRIPTION OF THE PREFERRED EMBODIMENTS

Figure 2:
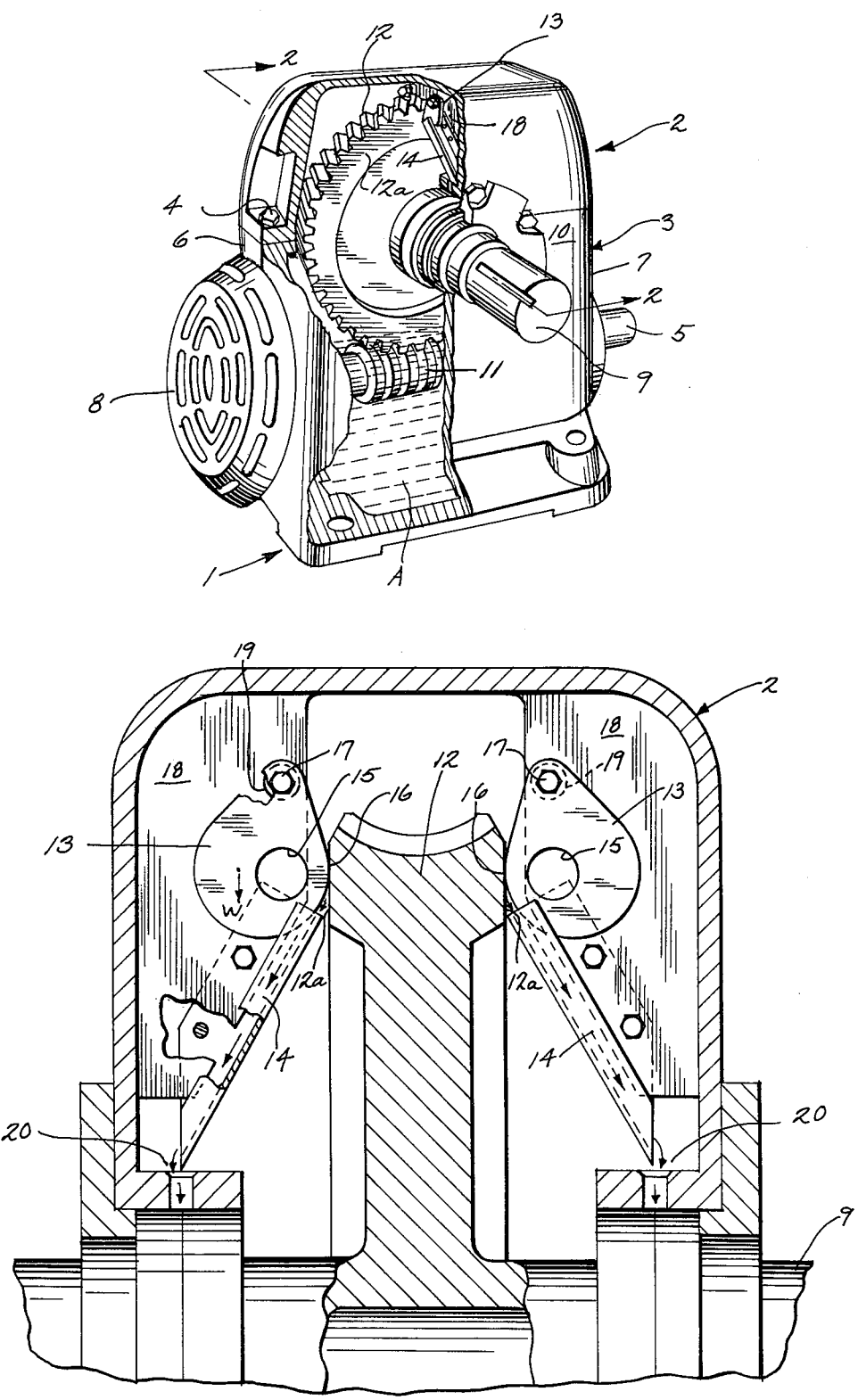
FIG. 2 is an enlarged transverse cross sectional view on the vertical plane through lines 2—2 of FIG. 1.

In FIG. 1 is illustrated a gear reduction system which comprises a housing 1 within which are mounted power transmitting shafts carrying an intermeshing gear and worm. The housing 1 comprises an upper section 2 and a lower section 3 bolted together by bolts 4 to form a sealed enclosure. The lower section 3 of the housing 1 is adapted to contain a body of lubricant A to lubricate the gears and bearings. An input shaft 5 is journaled at opposite ends in the side walls 6 and 7 of the housing 1. One end of the shaft 5 openly protrudes outward from the side wall 7 while the opposite end of the shaft is enclosed in a cover 8. The bearings (not shown) of the input shaft 5 are below the surface of the lubricant and require no additional lubrication. An outlet shaft 9 is journaled at opposite ends and protrudes through the front wall 10 of the housing 1. The input shaft 5 and the output shaft 9 are positioned orthogonal to each other.

The internal components of the reducer are shown in FIG. 1. A worm thread 11 is medially cut in the input shaft 5 and a gear 12 is disposed on the inner ends of the output shaft 9 to mesh with the worm thread 11. In the drawings it can be seen that the gear 12 dips into the lubricant pool and lifts lubricant therefrom. The lifting of the lubricant is accomplished by the carrying of the lubricant on the teeth of the gear and the adhering of the lubricant to the side surfaces of the gear. In FIGS. 1 and 2 the wipers 13 can be seen positioned one on each side of the gear 12 near the top of the gear. The wipers 13 remove lubricant to the U-shaped troughs 14. The troughs 14 either carry the lubricant to the bearings or communicate with passageways 20 in the housing which carry the lubricant to the bearings.

As seen in FIG. 2 the wiper 13 is preferably a generally tear-drop shaped, flat body having an aperture 15 and a curved surface 16 which rides along the side of the gear 12a. The wiper 13 is pivotally mounted at its upper narrow end of a pivot 17 on a support plate 18. The support plate also has mounted thereto the trough 14. The support plate 18 in turn is welded or otherwise attached to the housing 1.

In the preferred embodiment the pivot comprises a pin 17 with an enlarged head. The pin 17 extends through an aperture in the upper narrow end of the wiper 13 and is secured to the support plate 18. The aperture is slightly larger in diameter than the pin 17, but it is smaller than the head so that while the wiper freely pivots on the pin it cannot be dislodged therefrom. To insure free movement of the wiper 13, a washer 19 is positioned about the pivot between the wiper and the support plate.

As seen in FIG. 2, the pivot 17 and the aperture 15 are preferably located so that the center of gravity of the wiper 13 is on the opposite side of the pivot point from the curved wiping surface 16 so that gravity keeps the curved surface in contact with the side of the gear 12a. The washer 19 helps to assure that the gravity positioning feature of the wiper is maintained. The amount of pressure which the wiper 13 exerts on the surface of the gear 12a can be varied by adjusting the location of the pivot point or the size of the aperture 15 in the wiper. The aperture 15 is the preferred means of maintaining the center of gravity to the opposite side of the pivot point of the curved wiping surface 16. If desired, other means may be employed.

When the gear set is in operation, the wiper 13 is held by gravity against the side 12a of the gear 12 which is carrying the lubricant. The lubricant which is wiped from the gear falls from the wiper 13 into the trough 14 from where it flows directly to a bearing or into a passageway 20 in the housing that leads to a bearing. Eventually the lubricant is returned to the reservoir in the bottom of the housing from which it can once again be lifted by the gear 12.

The wiper 13 may be made in other shapes than the preferred tear-drop design and of any durable material, but preferably, it and the gear 12 are constructed of dissimilar materials. In most instances the wiper will be made of steel, but durable plastics and fiberous materials might be preferred in some instances.

The wiping means of the present invention is truly self-adjusting as the wiper is maintained by gravity in operating position against the side of the gear and no adjustment is required even when the position of the gear is altered to compensate for wear between the worm and the worm gear. If desired, the axial position of the gear can be altered to compensate for wear without requiring a compensating adjustment of the wiping means. In addition, any wear of the bearings which allows the gear to shift is automatically compensated for by the wiping means of the present invention. Furthermore, if desired, even the width of the gear used in the housing can be varied within limits without requiring a separate wiper adjustment. None of the aforementioned advantages are available with the prior art devices which were not self-adjusting.

While the invention has been described in connection with a worm gear unit, the use of the wiper is not so limited as it can be used with many other types of gears and other rotating objects. In addition, it can be used with objects that rotate in either direction.

The foregoing description was for purposes of illustration only, and it is to be understood that various changes can be made and designed by those skilled in the art without departing from the spirit and scope of this invention.

I claim:

1. A self-adjusting lubricant wiper for wiping lubricant from a generally vertical side of a rotating object, said wiper being adapted to be pivotally connected to a support for positioning near said rotating object, said wiper being a generally tear-drop shaped member which is adapted to be pivotally attached to the support at its narrow upper end, said wiper having a center of gravity which is to the opposite side of the pivot point of the curved wiping surface so that the wiping surface is maintained by gravity in a wiping relationship with the side of said rotating object.

2. A lubricant wiper for wiping lubricant from the face of a rotating object, said wiper being adapted to be pivotally connected to a pivot with a washer positioned between the pivot and the wiper, said pivot being mounted on a support member which is in turn affixed to a housing for the rotating object, said wiper having a curved wiping surface and a center of gravity which is to the opposite side of the pivot point of the curved wiping surface so that said curved wiping surface is maintained by gravity in wiping relationship with the face of said rotating object.

3. A gear set including:
 a. a housing, said housing having a reservoir of lubricant located in the bottom of said housing;
 b. a gear which dips into said lubricant and transports lubricant from said reservoir;
 c. wiping means positioned near the top of said gear adapted to wipe lubricant from a generally vertical side of said gear, said wiping means comprising a pivot, a self adjusting wiper body pivotally mounted on said pivot, said wiper body being a tear-drop shaped member which is adapted to be pivotally attached to the pivot at its upper narrow end, said wiper body having a center of gravity at the opposite side of the pivot point from the wiping surface so that gravity alone maintains the wiping surface of the wiper in contact with the generally vertical side of the gear to wipe lubricant therefrom; and
 d. means for collecting the lubricant from said wiper.

4. A gear set including:
 a. a housing, said housing having a reservoir of lubricant located in the bottom of said housing;
 b. a gear which dips into said lubricant and transports lubricant from said reservoir;
 c. wiping means positioned near the top of said gear adapted to wipe said lubricant from the generally vertical side of said gear, said wiping means comprising a pivot, a self-adjusting wiper body pivotally mounted on said pivot, a washer positioned between the pivot and the wiper body, said wiper body having a wiping surface and a center of gravity at the opposite side of the pivot point from the wiping surface so that the force of gravity maintains the wiping surface of the wiper in contact with the generally vertical side of the gear to wipe lubricant therefrom; and
 d. means for collecting the lubricant from said wiper.

* * * * *